(12) United States Patent
Tochigi et al.

(10) Patent No.: US 7,236,698 B2
(45) Date of Patent: Jun. 26, 2007

(54) IMAGING SYSTEM (75) Inventors: Akiyoshi Tochigi, Kokubunji (JP); Hirohiko Kimata, Hino (JP)

(73) Assignee: Olympus Corporation, Tokyo (JP)

( * ) Notice: Subject to any disclaimer, the term of this patent is extended or adjusted under 35 U.S.C. 154(b) by 928 days.

(21) Appl. No.: 10/615,125

(22) Filed: Jul. 9, 2003

(65) Prior Publication Data
US 2004/0021776 A1 Feb. 5, 2004

(30) Foreign Application Priority Data
Jul. 11, 2002 (JP) .............................. 2002-202861

(51) Int. Cl.
*G03B 13/02* (2006.01)
*G03B 17/20* (2006.01)
*G02B 25/00* (2006.01)
*H04N 5/222* (2006.01)

(52) U.S. Cl. ...................... 396/296; 396/374; 396/382; 348/333.08; 359/646

(58) Field of Classification Search ................ 396/296, 396/374, 382; 348/333.08, 333.09; 359/646
See application file for complete search history.

(56) References Cited

U.S. PATENT DOCUMENTS

| 4,217,048 A | 8/1980 | Egawa | 396/382 |
| 5,099,265 A * | 3/1992 | Lee | 396/374 |
| 6,958,863 B2 * | 10/2005 | Miyauchi et al. | 359/646 |
| 2005/0264674 A1 * | 12/2005 | Miyauchi et al. | 348/335 |
| 2006/0262212 A1 * | 11/2006 | Miyauchi et al. | 348/333.01 |
| 2006/0274181 A1 * | 12/2006 | Miyauchi et al. | 348/333.01 |
| 2006/0274182 A1 * | 12/2006 | Miyauchi et al. | 348/333.01 |

FOREIGN PATENT DOCUMENTS

| JP | 5-45594 | 2/1993 |
| JP | 8-29705 | 2/1996 |
| JP | 2806104 | 7/1998 |
| JP | 10-161190 | 9/1998 |
| JP | 11-160630 | 6/1999 |
| JP | 2000-13652 | 1/2000 |

* cited by examiner

*Primary Examiner*—W. B. Perkey
(74) *Attorney, Agent, or Firm*—Pillsbury Winthrop Shaw Pittman LLP (57) ABSTRACT

The invention relates to an imaging system equipped with an electronic viewfinder suitable for compactness and having a sufficient angle of viewing field and satisfactory optical performance, especially the ability to prevent harmful light. The imaging system comprises an image pickup optical system, an image pickup device for receiving a light beam guided by the image pickup optical system, an image display device for displaying an image thereon, a controller for converting image information obtained from the image pickup device into signals capable of being displayed on the image display device, and a viewing optical system for guiding an image appearing on the image display device to a viewer's eye. The viewing optical system comprises, in order from an image display device side, one negative lens and one positive lens.

15 Claims, 7 Drawing Sheets

IMAGING SYSTEM

This application claims benefit of Japanese Application No. 2002-202861 filed in Japan on Jul. 11, 2002, the contents of which are incorporated by this reference.

BACKGROUND OF THE INVENTION

The present invention relates generally to an imaging system such as a silver-halide camera or a digital camera, and more particularly to an imaging system equipped with an electronic viewfinder that is suitably used with a small-sized image display device, especially a liquid crystal display device.

Most silver-halide cameras or digital cameras comprise means for recording images by an image pickup optical system, and a viewing optical system for checking image pickup ranges. As the image recording means, chemical reactions on a film surface are used for silver-halide cameras, and information obtained by photoelectric conversion on an electronic image pickup device such as a CCD is used for the digital cameras.

On the other hand, the viewing optical system is often designed such that a light beam from a subject side is guided to a viewer side to form an image on the viewer's retina, thereby observing the image to be picked up. This type of viewing optical system is used with or without an image pickup optical system for forming an image that records a part of the entrance side. Among the former there is typically a single-lens reflex camera. Among the latter there is typically a real image type finder that is suitable for a zoom optical system and comprises an object optical system, an image-erecting means and an eyepiece optical system. Such finders, mounted on many commercial products, are sometimes generally called optical finders.

Instead of the optical finder, many commercially available digital cameras or video cameras incorporate an electronic finder that provides a direct view of an image formed on an electronic display device such as an LCD (liquid crystal display) to enable the viewer to check the image pickup range. Many digital cameras incorporating both the optical finder and the electronic finder, too, are commercialized.

A so-called EVF (electronic viewfinder) designed to observe virtual images on LCDs through a viewing optical system has also been proposed. For conventional products incorporating such an electronic finder, there is used a display device with a display screen having a diagonal length of about 0.5 inch (about 12 mm).

In recent years, the demand for size reductions of cameras has grown.

Currently developed LCDs are smaller in size than ever before. With this, it is now required to reduce the whole size of the viewing optical system in conformity with LCD size, increase the magnification of the viewing optical system depending on size reductions of image display devices, etc.

When a reflection type display device adapted to enter light rays from its display screen therein is used as the image display device, it is required to ensure the optical path necessary for displaying images.

SUMMARY OF THE INVENTION

According to the first aspect of the present invention, there is provided an imaging system comprising an image pickup device, an image display device for displaying an image thereon, a controller for converting image information obtained from the image pickup device into signals capable of being displayed on the image display device, and a viewing optical system for guiding an image appearing on the image display device to a viewer's eye, characterized in that:

the viewing optical system comprises, in order from an image display device side, one negative lens and one positive lens, and satisfies conditions (1) and (2):

$$0.45 < b/a \quad (1)$$

$$2.3 < dp/dn < 7 \quad (2)$$

where a is the distance from the display screen of the image display device to the surface of the viewing optical system, which is located nearest to the image display device side, b is the axial length from the surface of the viewing optical system which is located nearest to the image display device side to the surface of the viewing optical system which is located nearest to a viewer side, dp is the thickness of the positive lens, and dn is the thickness of the negative lens.

Advantages of the first imaging system of the present invention are now explained.

Referring first to a lens used herein, a medium interposed between two refracting surfaces between which there is no refracting surface is thought of as one unit, and referring then to a lens component used herein, a medium interposed between two air contact surfaces between which there is no air separation is taken as one unit. Typically, the lens component means a single lens, and a cemented lens. The thickness of a lens means an axial thickness.

To make correction for chromatic aberration of magnification, at least one negative lens and at least one positive lens are required. To allow an image to be viewed even on a small-sized image display device over a sufficient field of view, it is preferable to expand light rays through the negative lens and then guide the expanded light rays to the eyeball of a viewer through the positive lens. At this time, if the negative lens is sufficiently spaced away from the positive lens, it is then easy to ensure the field of view even with two single lenses. A light beam that emerges in the vertical direction to the display screen is generally best for the visibility of an image displayed on the display device screen. Thus, if the negative lens and the positive lens are arranged in order from the display screen side, it is then easy to utilize a light beam emerging substantially vertically from the display screen as viewing light.

Condition (1) is provided to place the distance from the display screen to the viewing optical system and the length of the viewing optical system in a well-balanced state. To obtain a large angle of field with a small-sized image display device, it is required to make the focal length of the viewing optical system short. However, when the lower limit of 0.45 to condition (1) is not reached or the length of the viewing optical system becomes short, it is required to increase the angle of refraction of axial and off-axis light rays through the viewing optical system, resulting often in the occurrence of aberrations such as spherical aberrations, coma and chromatic aberration of magnification. Otherwise, the distance from the display screen to the viewing optical system becomes too long to obtain the necessary angle of field.

Condition (2) is provided to balance making the viewing optical system compact against ensuring the angle of field. As the lower limit of 2.3 is not reached, the positive lens becomes too thin to ensure sufficient refracting power. Exceeding the upper limit of 7 is unfavorable for reducing the size of the viewing optical system because the thickness of the positive lens becomes large.

To reduce the whole size of an electronic viewfinder, it is preferable to satisfy the following condition (1-1).

$$0.6 < b/a < 1.0 \tag{1-1}$$

So long as the lower limit of 0.6 to this condition is satisfied, it is then easier to make correction for aberrations such as spherical aberrations, coma and chromatic aberration of magnification, and to obtain the necessary angle of field even when the distance from the display screen to the viewing optical system is cut down. As the upper limit of 1.0 is exceeded, the length of the viewing optical system becomes too long to achieve size reductions even with a small-sized image display device. Otherwise, the spacing between the display screen and the viewing optical system becomes short, leaving dust clinging to the viewing optical system noticeable. When a reflection type image display device is used as the image display device, it is difficult to take an optical path for the guidance of illumination light.

More preferably, $$0.61 < b/a < 0.78 \tag{1-2}$$

Instead of condition (2), it is more preferable to satisfy:

$$2.5 < dp/dn < 6.9 \tag{2-1}$$

Most preferably, $$2.7 < dp/dn < 6.7 \tag{2-2}$$

According to the second aspect of the present invention, there is provided an imaging system comprising an image pickup device, an image display device for displaying an image thereon, a controller for converting image information obtained from the image pickup device into signals capable of being displayed on the image display device, and a viewing optical system for guiding an image appearing on the image display device to a viewer's eye, characterized in that:

the viewing optical system comprises, in order from an image display device side, a negative single lens component comprising one negative lens and a positive single lens component comprising one positive lens, and satisfies conditions (1) and (3):

$$0.45 < b/a \tag{1}$$

$$0.3 < da/dn < 1.7 \tag{3}$$

where a is the distance from the display screen of the image display device to the surface of the viewing optical system, which is located nearest to the image display device side, b is the axial length from the surface of the viewing optical system which is located nearest to the image display device side to the surface of the viewing optical system which is located nearest to a viewer side, da is the air separation between the negative lens and the positive lens, and dn is the thickness of the negative lens.

Advantages of the second imaging system of the present invention are now explained.

To allow an image to be viewed even on a small-sized image display device over a sufficient field of view, it is preferable to expand light rays through the negative lens and then guide the expanded light rays to the eyeball of a viewer through the positive lens. At this time, if the negative lens is sufficiently spaced away from the positive lens, it is then easy to ensure the field of view even with two single lenses. A light beam that emerges in the vertical direction to the display screen is generally best for the visibility of an image displayed on the display device screen. Thus, if the negative lens and the positive lens are arranged in order from the display screen side, it is then easy to utilize a light beam emerging substantially vertically from the display screen as viewing light.

Condition (1) is provided to place the distance from the display screen to the viewing optical system and the length of the viewing optical system in a well-balanced state. To obtain a large angle of field with a small-sized image display device, it is required to make the focal length of the viewing optical system short. However, when the lower limit of 0.45 to condition (1) is not reached or the length of the viewing optical system becomes short, it is required to increase the angle of refraction of axial and off-axis light rays through the viewing optical system, resulting often in the occurrence of aberrations such as spherical aberrations, coma and chromatic aberration of magnification. Otherwise, the distance from the display screen to the viewing optical system becomes too long to obtain the necessary angle of field.

Condition (3) is provided to define the spacing between the positive lens and the negative lens, thereby achieving size reductions of the viewing optical system and ensuring the angle of field. To ensure a satisfactory angle of field, it is preferable to expand light rays through the negative lens and then guide the expanded light rays to the eyeball of the viewer through the positive lens. Falling short of the lower limit of 0.3 to this condition is unfavorable for ensuring the angle of field, because the positive lens and the negative lens come close to each other, and exceeding the upper limit of 1.7 is unfavorable for achieving size reductions of the viewing optical system, because the air separation becomes large.

Instead of condition (1), it is more preferable to satisfy the following condition (1-1) as already mentioned:

$$0.6 < b/a < 1.0 \tag{1-1}$$

Even more preferably, $$0.61 < b/a < 0.78 \tag{1-2}$$

For condition (3), it is more preferable to satisfy:

$$0.35 < da/dn < 1.58 \tag{3-1}$$

Most preferably, $$0.4 < da/dn < 1.45 \tag{3-2}$$

According to the third aspect of the present invention, the first or second imaging system is further characterized by satisfying condition (4):

$$1.0 < a/c \tag{4}$$

where a is the distance from the display screen of the image display device to the surface of the viewing optical system, which is located nearest to the image display device side, and c is the length of the viewing optical system as measured in the short side direction of the display screen.

Advantages of the third imaging system of the present invention are now explained.

Condition (4) is provided to define the length of the viewing optical system from the display screen relative to the short side direction of the display screen. As the lower limit of 1.0 to condition (4) is not reached, dust clinging to the viewing optical system becomes noticeable. When a reflection type image display device is used, it is impossible to take a reflection optical path for guiding illumination light to the image display device.

To reduce the whole size of the electronic viewfinder, it is further preferable to satisfy:

$$2.0 < a/c < 4.5 \tag{4-1}$$

So long as the lower limit of 2.0 to condition (4-1) is satisfied, dust clinging to the viewing optical system becomes less noticeable, and it is easy to take a reflection optical path for guiding illumination light to the image display device when a reflection type image display device is used. As the upper limit of 4.5 is exceeded, the spacing between the image display device and the viewing optical system becomes too large to achieve compactness even with a small-sized image display device.

More preferably, $$2.1 < a/c < 4.3 \tag{4-2}$$

According to the fourth aspect of the present invention, the first or second imaging system is further characterized by satisfying condition (5):

$$1.3 \le fe/a < 2.0 \tag{5}$$

where a is the distance from the display screen of the image display device to the surface of the viewing optical system, which is located nearest to the image display device side, and fe is the focal length of the viewing optical system.

Advantages of the fourth imaging system of the present invention are now explained.

Condition (5) is provided to define a sufficient spacing between the display device and the viewing optical system and the necessary eye relief. As the lower limit of 1.3 is not reached, it is difficult to obtain the eye relief necessary for viewing, and as the upper limit of 2.0 is exceeded, it is difficult to obtain the angle of field sufficient for viewing.

More preferably, $$1.4 \le fe/a < 1.7 \tag{5-1}$$

Most preferably, $$1.41 \le fe/a < 1.68 \tag{5-2}$$

According to the fifth aspect of the present invention, the first or second imaging system is further characterized by satisfying condition (3-3):

$$0.4 < da/dn < 1.1 \tag{3-3}$$

where da is the air separation between the negative lens and the positive lens, and dn is the thickness of the negative lens.

Advantages of the fifth imaging system of the present invention are now explained.

Condition (3-3) is provided to make the range defined by condition (3) so narrower that a more sensible tradeoff can be made between ensuring the angle of field and achieving compactness.

According to the sixth aspect of the present invention, the first or second imaging system is further characterized by satisfying condition (6):

$$2.0 < r2/r3 < 3.2 \tag{6}$$

where r2 is the axial radius of curvature of the surface of the negative lens that faces the viewer side, and r3 is the axial radius of curvature of the surface of the positive lens that faces the image display device side.

Advantages of the sixth imaging system of the present invention are now explained.

Referring to condition (6), the bending states of the negative lens and the positive lens vary as r2/r3 changes. As the lower limit of 2.0 to condition (6) is not reached, r2 and r3 come close to each other with the rear surface of the positive lens tending to decrease in the radius of curvature. It is then difficult to make well-balanced correction for astigmatism, distortion and coma. As the upper limit of 3.2 to condition (6) is exceeded, the separation between r2 and r3 becomes large. With this, the radius of curvature of the rear surface of the positive lens tends to increase. It is then difficult to make well-balanced correction for spherical aberrations, astigmatism and coma.

More preferably, $$2.4 < r2/r3 < 3.1 \tag{6-1}$$

Most preferably, $$2.7 < r2/r3 < 3.0 \tag{6-2}$$

According to the seventh aspect of the present invention, the first or second imaging system is further characterized in that the negative lens is a double-concave lens and the positive lens is a double-convex lens.

Advantages of the seventh imaging system of the present invention are now explained.

Using the double-concave lens as the negative lens and the double-convex lens as the positive lens is favorable for correction of aberrations, because the refracting power of each lens can be allocated to both its surfaces.

According to the eighth aspect of the present invention, the first or second imaging system is further characterized in that the negative lens is a double-concave lens and the positive lens is a double-convex lens with satisfaction of condition (3-3).

$$0.4 < da/dn < 1.1 \tag{3-3}$$

Here da is the air separation between the negative lens and the positive lens, and dn is the thickness of the negative lens element.

Advantages of the eighth imaging system of the present invention are now explained.

Using the double-concave lens as the negative lens and the double-convex lens as the positive lens is favorable for correction of aberrations, because the refracting power of each lens can be allocated to both its surfaces.

Condition (3-3) is provided to make the range defined by condition (3) so narrower that a more sensible tradeoff can be made between ensuring the angle of field and achieving compactness.

According to the ninth aspect of the present invention, the first or second imaging system is characterized by further comprising an image pickup optical system.

Advantages of the ninth imaging system of the present invention are now explained.

With this arrangement, it is possible to observe the image of a subject depending on the properties (angle of view, depth of focus, etc.) of the image pickup optical system. In this case, the imaging system of the present invention could be provided with a mount that enables any desired image pickup optical system to be incorporated therein.

The tenth aspect of the present invention, the first or second imaging system is further characterized in that a stop is interposed between the negative lens and the positive lens.

Advantages of the tenth imaging system of the present invention are now explained.

A decrease in the effective diameter of a lens may lead to a reduction in the size of a viewing optical system. However, as the effective diameter of the lens becomes small, light rays are apt to strike on the edge of the lens, resulting in the occurrence of harmful light such as ghosts or flares. In the arrangement of the present invention where a light beam is expanded through the negative lens for incidence upon the positive lens, harmful light is apt to occur at the edge of the positive lens. With the stop interposed between the negative lens and the positive lens, however, ghosts, flares or other harmful light—which are caused when light leaving the image display device strikes upon the edges of the lenses and detrimental to images—can be reduced even with lenses having a limited effective diameter.

According to the 11th aspect of the present invention, there is provided an imaging system comprising an image pickup device, an image display device for displaying an image thereon, a controller for converting image information obtained from the image pickup device into signals capable of being displayed on the image display device and a viewing optical system for guiding an image appearing on the image display device to a viewer's eye, characterized in that:

the viewing optical system comprises, in order of an image display device side, a negative lens component and a positive lens component, while a stop is located in an air space that contacts the positive lens component.

Advantages of the 11th imaging system of the present invention are now explained.

To allow an image to be viewed even on a small-sized image display device over a sufficient field of view, it is preferable to expand light rays through the negative lens component and then guide the expanded light rays to the eyeball of the viewer through the positive lens component. At this time, if the negative lens component is sufficiently spaced away from the positive lens component, it is then easy to ensure the field of view even with two lens components. A light beam that emerges in the vertical direction to the display screen is generally best for the visibility of an image displayed on the display device screen. Thus, if the negative lens component and the positive lens component are arranged in order from the display screen side, it is then easy to utilize a light beam emerging substantially vertically from the display screen as viewing light.

By arranging the negative lens component and the positive lens component in this order so that a rim light beam is converged after divergence, it is thus possible to obtain a wide-field electronic viewfinder. According to such an arrangement, on the other hand, a light beam other than a light beam that is normally viewed on the image display device is readily guided by the diverging action of the negative lens component to the edge of the positive lens component. Upon arriving at the eyeball of the viewer, light reflected at that edge becomes harmful light that causes image degradation such as ghosts or flares.

To, in such a lens layout, reduce an adverse influence on the normally viewed light beam and minimize the influence of harmful light, it is effective to locate in an air space contacting the negative and positive lens components a stop for minimizing harmful light.

According to the 12th aspect of the present invention, the 11th imaging system is further characterized in that the stop located in the air space that contacts the positive lens component is a stop interposed between the negative lens component and the positive lens component.

Advantages of the 12th imaging system of the present invention are now explained.

By interposing the stop between the positive lens component and the negative lens component, harmful light can efficiently be removed while the shading of an effective light beam is minimized.

According to the 13th aspect of the present invention, the 11th or 12th imaging system is further characterized in that the relation to the positive lens component of the effective radius of the stop interposed between the negative lens component and the positive lens component satisfies at least either one of conditions (7) and (8):

$$0.05 < (YbL - YaL)/zL < 0.4 \quad (7)$$

$$0.05 < (YbS - YaS)/zS < 0.4 \quad (8)$$

Here zL is the axial distance from a stop surface to the end of the exit surface of the positive lens component as measured on a section including an optical axis in the long side direction, YaL is the effective radius of the stop as measured on the section in the long side direction, YbL is the distance from the optical axis to the end of the exit surface of the positive lens component as measured on the section in the long side direction, zS is the axial distance from the stop surface to the end of the exit surface of the positive lens component as measured on a section including the optical axis in the short side direction, YaS is the effective radius of the stop as measured on the section in the short side direction, and YbS is the distance from the optical axis to the end of the exit surface of the positive lens component as measured on the section in the short side direction.

Advantages of the 13th imaging system of the present invention are now explained.

Conditions (7) and (8) are provided to define more preferable requirements regarding harmful light reflected at the edge of the positive lens component. As the respective lower limits of 0.05 to conditions (7) and (8) are not reached, removal of harmful light becomes less than satisfactory. As the upper limits of 0.4 are exceeded, on the other hand, there is a high possibility that the effective light beam may be shaded, failing to ensure the quantity of rim light, although removal of harmful light is easily achievable. To avoid such shading, the outside diameter of the positive lens component must be increased, resulting in an increase in the size of the imaging system.

It is of course more desirable to satisfy both conditions (7) and (8) at the same time.

Instead of conditions (7) and (8), it is more preferable to satisfy the following conditions (7-1) and/or (8-1).

$$0.07 < (YbL - YaL)/zL < 0.35 \quad (7\text{-}1)$$

$$0.07 < (YbS - YaS)/zS < 0.35 \quad (8\text{-}1)$$

Even more preferably, the following conditions (7-2) and/or (8-2) should be satisfied.

$$0.1 < (YbL - YaL)/zL < 0.3 \quad (7\text{-}2)$$

$$0.1 < (YbS - YaS)/zS < 0.3 \quad (8\text{-}2)$$

Most preferably, conditions (7-2) and (8-2) should be satisfied at the same time.

According to the 14th aspect of the present invention, the 11th, 12th or 13th imaging system is further characterized in that the negative lens component is of double-concave shape and the positive lens component is of double-convex shape.

Advantages of the 14th imaging system of the present invention are now explained.

It is favorable for correction of aberrations to configure the negative and the positive lens component into the double-concave shape and the double-convex shape, respectively, because the main refracting power to be born by each lens component is allocated to both its surfaces.

According to the 15th aspect of the present invention, the 11th, 12th, 13th or 14th imaging system is further characterized in that the stop is of substantially rectangular shape substantially similar to that of the image display device.

Advantages of the 15th imaging system of the present invention are now explained.

By making the stop have a substantially rectangular shape substantially similar to that of the image display device, it is possible to efficiently remove harmful light reflected at the edge of the positive lens component.

In the present invention, the aforesaid arrangements could be used in combinations of two or more, thereby obtaining the advantages of the respective arrangements.

Two or more of conditions (1) to (8) and the conditions depending on them could be satisfied at the same time.

Regarding these conditions, only the lower or the upper limits could be so set that the associated advantages could be obtained.

As a matter of course, the values set out in the following examples could be used as the lower or the upper limits to the conditions.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Some embodiments of the imaging system of the invention are now explained.

Figure 1:
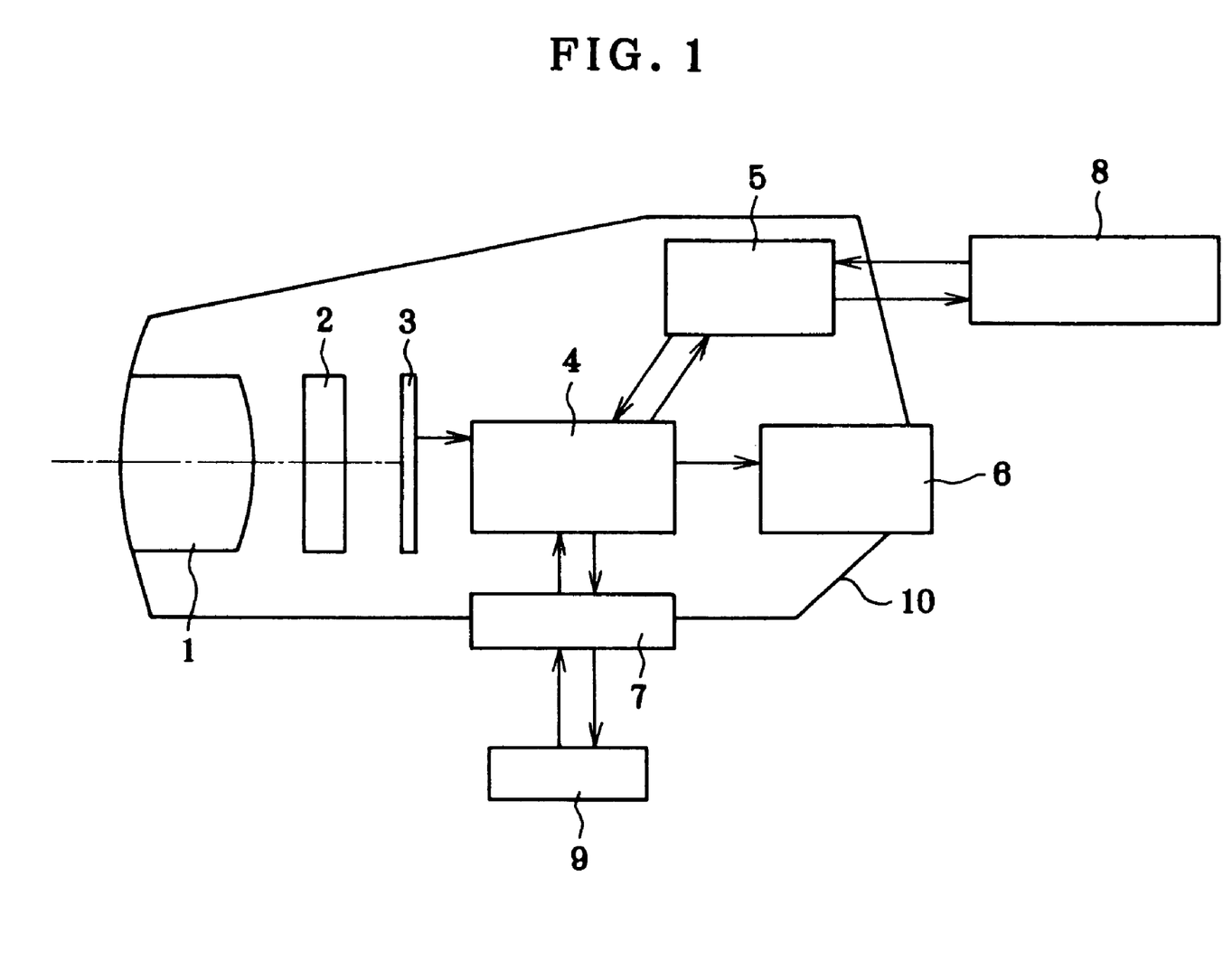
FIG. 1 is illustrative of the construction of a digital camera that is one embodiment of the imaging system of the invention.

FIG. 1 is illustrative of the construction of a digital camera that is one embodiment of the imaging system of the invention, and is generally shown at 10. The digital camera 10 is made up of an image pickup optical system 1, a filter 2, an image pickup device 3, a controller 4, a built-in memory 5, an electronic viewfinder 6 and an interface 7.

In that imaging system, light emanating from an object point passes through the image pickup optical system 1 comprising an optical element such as a lens to form an object image on the photoreceptor surface of the image pickup device 3 such as a CCD. The image pickup device 3 is an assembly of regularly arrayed photoelectric converters that are inherently susceptible to a moiré phenomenon. To prevent this phenomenon, the filter 2 having a low-pass action is interposed between the image pickup optical system 1 and the image pickup device 3. An infrared cut filter for cutting off infrared light could also be located.

Upon incidence on the image pickup device 3, a light beam is converted by the photoelectric converters into electrical signals, which are then entered into the controller 4 for signal processing such as gamma correction and image compression. The ensuing outputs are entered via the built-in memory 5 and interface 7 into a personal computer 9 or the like.

The signals are also sent from the controller 4 to the image display device (not shown in FIG. 1), so that the image to be picked up or the picked-up image can be viewed by the viewer through the electronic viewfinder 6 built up of a lighting system, an image display device and a viewing optical system. Image data could be sent from the built-in memory 5 to an auxiliary memory 8. On the other hand, the same image data could be sent out of the interface 7 to the personal computer 9.

Figure 2:
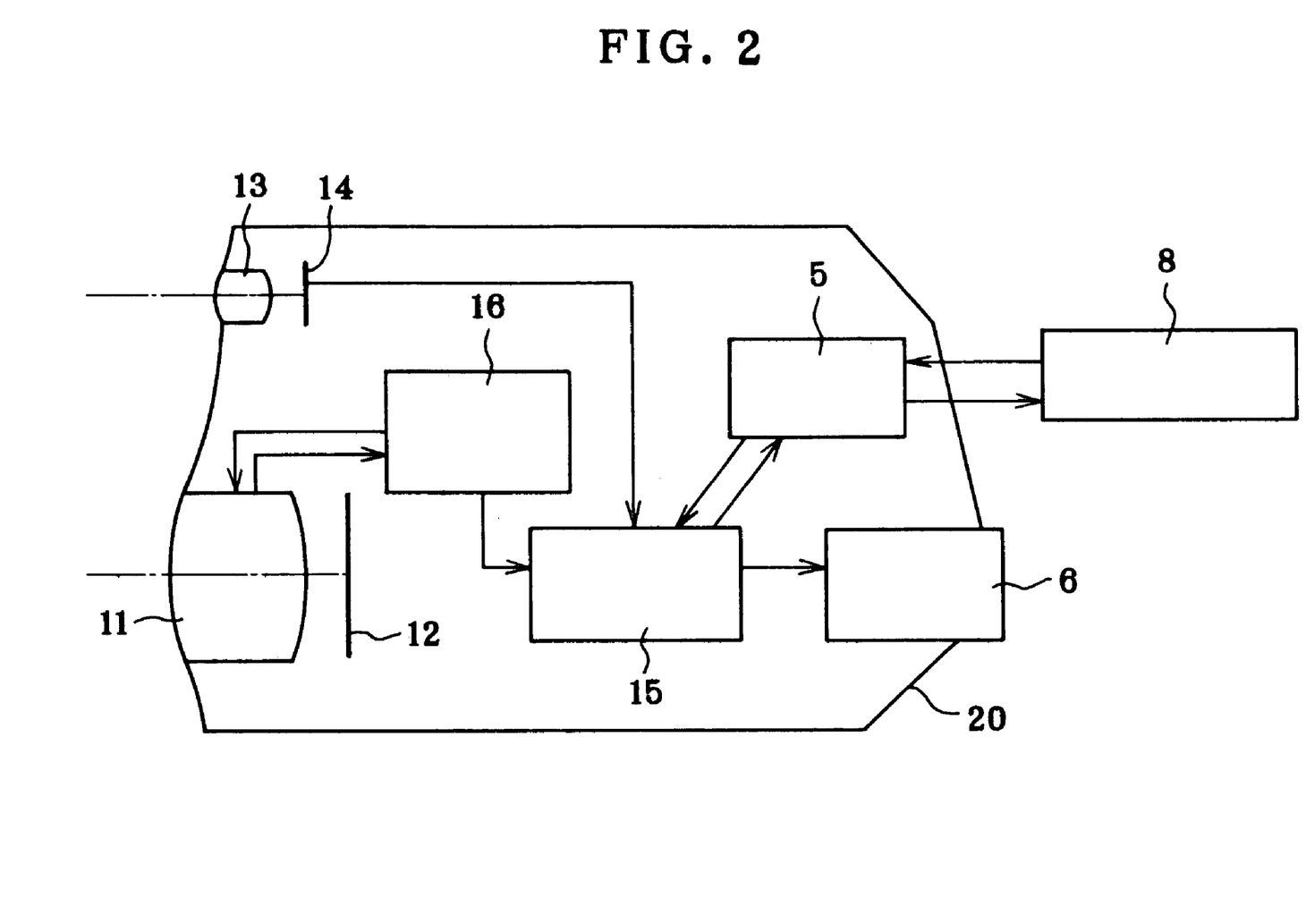
FIG. 2 is illustrative of the construction of a silver-halide camera to which the imaging system of the invention is applied.

FIG. 2 is illustrative of the construction of a silver-halide camera to which the imaging system of the invention is applied. As shown in FIG. 2, a silver-halide camera 20 equipped with the imaging system of the invention comprises an image pickup optical system 11, a film 12, an objective lens 13, an image pickup device 14 such as a CCD, a first controller 15 and another or a second controller 16, and further includes a built-in memory 5 and an electronic viewfinder 6 as is the case with the digital camera of FIG. 1.

In the silver-halide camera 20 of FIG. 2, a light beam from an object point forms an object image on the film 12 through the image pickup optical system 11. The light beam emanating from the object point also forms an object image on the image pickup device 14 such as a CCD through the objective lens 13 different from the image pickup optical system 11. Upon incidence on the image pickup device 14, the light beam is converted by photoelectric converters forming the image pickup device 14 into electrical signals, which are then entered into the first controller 15 for signal processing such as gamma correction and image compression. The ensuing signals are sent to the image display device so that the image to be picked up can be viewed by the viewer through the electronic viewfinder 6 comprising a lighting system, an image display device and a viewing optical system.

On the other hand, the user (viewer) can view the picked-up image using information etc. stored in the built-in memory 5 through the controller 15.

The second controller 16 is provided to control the image pickup optical system 11. On the basis of signals from the second controller 16, information on the zooming, focusing, etc. of the image pickup optical system 11 is recognized by the first controller 15 to gain control in conformity with the angle of view of the image to be displayed. Alternatively, information about the focusing, etc. of the image pickup optical system 11 could be recognized by the second controller 16 so that the image displayed on the display device could be corrected for its range (parallax correction). Still alternatively, signals from the first controller 15 could be sent to the built-in memory 5 or an interface (not shown), and then to a personal computer, etc.

The objective lens 13 could be dispensed with. In this case, the light beam from the image pickup optical system 11 is split into finder light beams, which are then used to form an image on the image pickup device 14 such as a CCD, so that the object image can be viewed.

In what follows, the electronic viewfinder used herein is explained.

Figure 3:
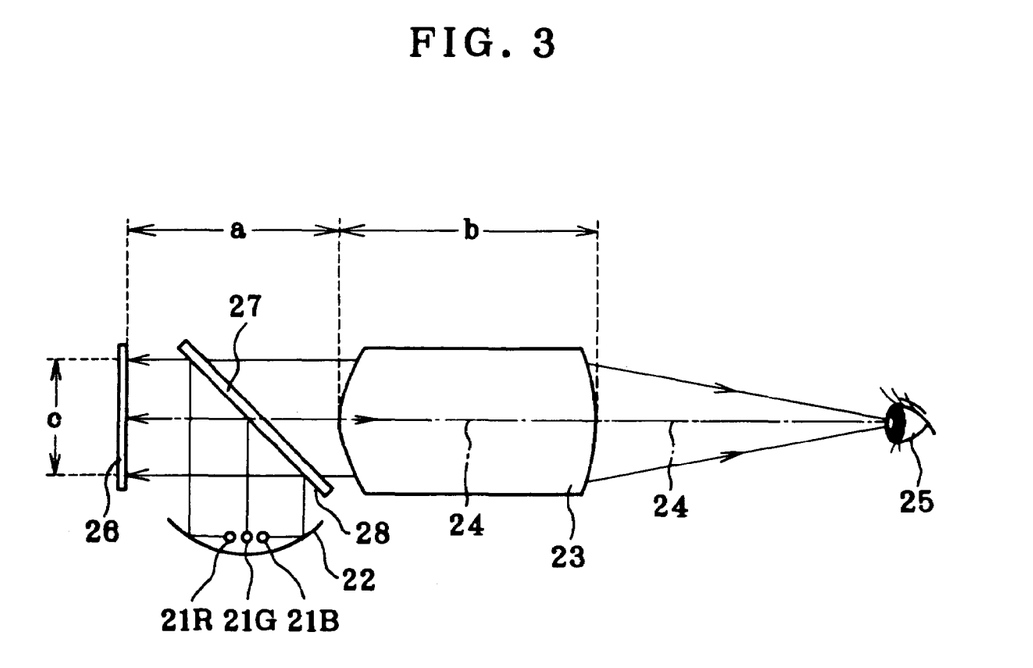
FIG. 3 is illustrative of a typical embodiment of the electronic viewfinder according to the invention.

FIG. 3 is illustrative of an exemplary construction of the electronic viewfinder of the invention, with reference numerals 21R, 21G and 21B indicative of a red light source, a green light source and a blue light source, respectively. For these light sources, for instance, light-emitting diodes are used. Reference numeral 22 is a lighting optical system, 23 a viewing optical system, 24 an optical axis of the viewing optical system 23, 25 a viewer's eye, 26 a reflection type image display device, and 27 a plane-parallel plate provided with a polarizing half-silvered mirror 28.

In the finder of such construction, illumination light from the light sources 21R, 21G and 21B is reflected back by the lighting optical system 22 comprising a reflecting mirror in one direction (coming out of the paper). The optical axis 24 of the viewing optical system 23 is set in such a way as to intersect vertically the image display device 26 at its substantial center.

The resulting illumination light propagates such that the light beam intersects at its center substantially with the optical axis 24 of the viewing optical system 23, and arrives at the half-silvered mirror 28 at which it is reflected toward the reflection type image display device 26.

The reflection type image display device 26 is a reflection type of twisted nematic liquid crystal display device with a set twist angle of 45°.

An image appearing on the reflection type display device 26 is observed by the viewer through the viewing optical system 23 via the plane plate 27 having the polarizing half-silvered mirror 28.

Where, in the electronic viewfinder of such construction, illumination light emanating from the light sources 21R, 21G and 21B is in a randomly polarized state, the illumination light is linearly polarized by the polarizing half-silvered mirror 28 in a certain direction, lighting the liquid crystal display device 26. For instance, where the polarizing half-silvered mirror 28 is set in such a way as to reflect s-waves and transmit p-waves, the illumination light reflected at the half-silvered mirror 28 turns to s-polarized light. This illumination light, reflected at the half-silvered mirror to illuminate the liquid crystal display device 26 or the image display device, passes through a liquid crystal layer with voltage-applied pixels, and is reflected at the bottom thereof, leaving the liquid crystal layer with the direction of polarization turned 90°. In other words, the illumination light, incident on the image display device 26 in the form of s-waves and modulated there, leaves it in the form of p-waves. The p-polarized light is again incident on the plane-parallel plate 27, and almost all of the light passes through the polarizing half-silvered mirror 28, arriving at the viewer's eye 25 via the viewing optical system 23.

The light sources 21R, 21G and 21B are successively put on so that red, green and blue light rays are successively guided to the liquid crystal display device 26. Accordingly, the liquid crystal display device 26 allows images corresponding the thus guided light rays to appear successively on the display screen, thereby forming color images.

As described above, the electronic viewfinder used herein is of more simplified construction. In addition, this electronic viewfinder can make effective use of light emanating from the light sources 21R, 21G and 21B with little light quantity loss, and so can be reduced in size and weight. The viewer could perceive an image on the image display device 26 as a virtual image magnified by the action of the viewing optical system 23. In this case, the electronic viewfinder should preferably be constructed such that an illumination optical path wherein a light beam leaving the light sources 21R, 21G and 21B is reflected at the polarizing half-silvered mirror 28 for incidence on the image display device 26 and a viewing optical path wherein the light beam reflected at the image display device 26 is guided to the viewer's eye through the polarizing half-silvered mirror 28 forms a go-and-return optical path between the polarizing half-silvered mirror 28 and the image display device 26. Such a go-and-return optical path allows the "go" and "return" optical paths through the viewing optical system to be designed in the form of a single optical path, and so can dispense with extra optical elements (transmitting and reflecting surfaces) and useless space as compared with an optical system having both the optical paths separately therein. It is thus possible to make the imaging system more compact and help prevent the occurrence of flare light.

In the finder shown in FIG. 3, the half-silvered mirror 28 could be formed of a curved surface such as a rotationally symmetric paraboloid. Alternatively, the illumination optical system 22 could be located in an optical path transmitting through the half-silvered mirror 28 and the viewing optical system 23 in an optical path for reflecting the half-silvered mirror 28. In this case, the distance a from the display screen of the image display device 26 to the surface of the viewing optical system 23 located nearest to the image display device 26 side is understood to mean the length of each optical path. Instead of the reflection type image display device, a transmission type image display device could be used. In this case, the light sources 21R, 21G and 21B and the illumination optical system 22 are located behind the image display device 26 with no need of using the half-silvered mirror 28.

Referring here to FIG. 3, parameters a, b and c concerning conditions (1), (4) and (5) according to the invention are given.

The viewing optical system 23 in the electronic viewfinder of FIG. 3 can be set up as in the following examples.

In Example 1, 2, 5, and 6, the display screen is of a rectangular shape of 8.9 mm in the horizontal direction and 6.66 mm in the vertical (short side) direction with a diagonal length of 11.164 mm. In Example 3, and 4, the display screen is of a rectangular shape of 3.84 mm in the horizontal direction and 2.88 mm in the vertical (short side) direction with a diagonal length of 4.8 mm.

Figure 4A:
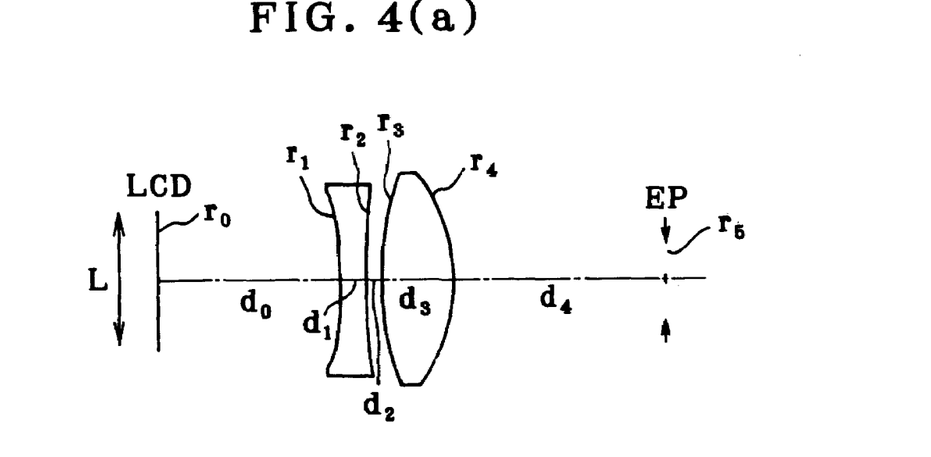
FIGS. 4(a), 4(b) and 4(c) are illustrative in section of Examples 1, 2 and 3 of the viewing optical system of the invention, including its optical axis.
Figure 4B:
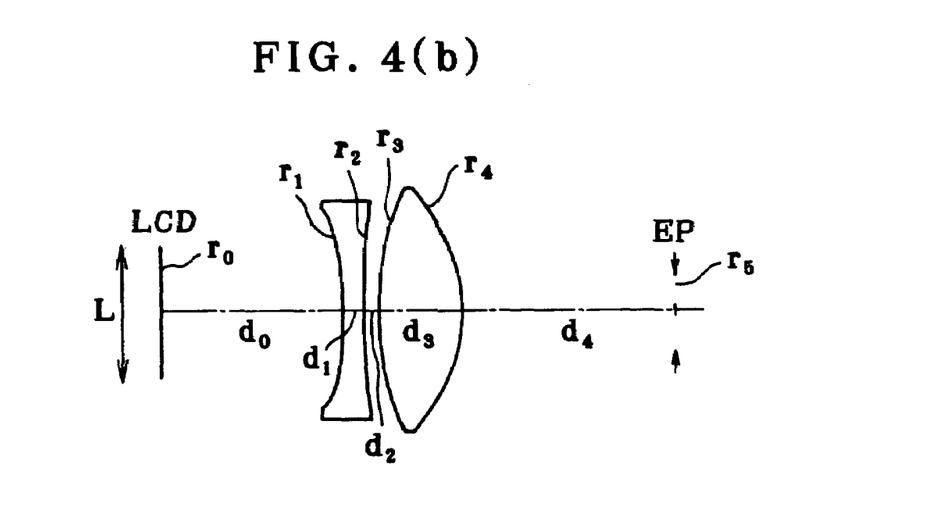
Figure 4C:
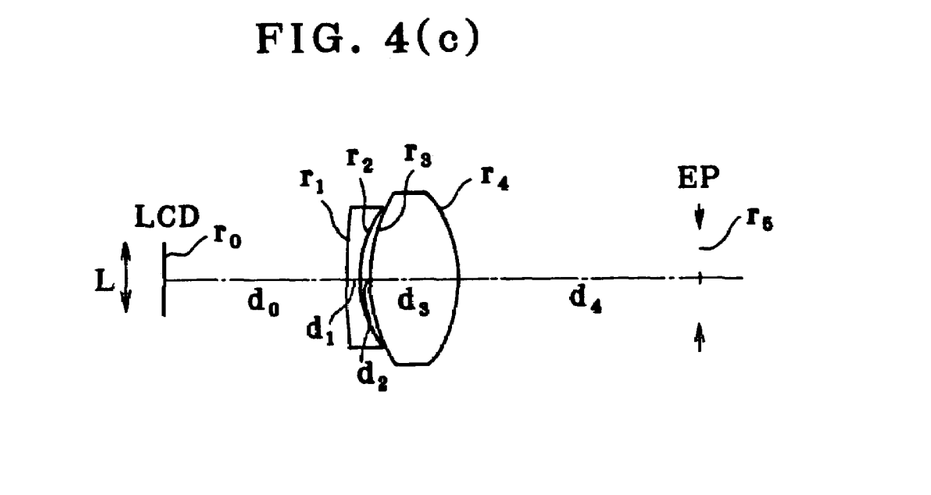
Figure 5A:
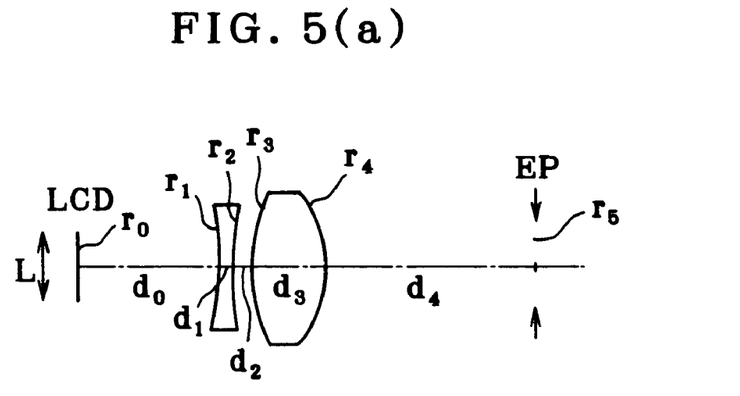
FIGS. 5(a), 5(b) and 5(c) are illustrative in section of Examples 4, 5 and 6 of the viewing optical system of the invention, including its optical axis.
Figure 5B:
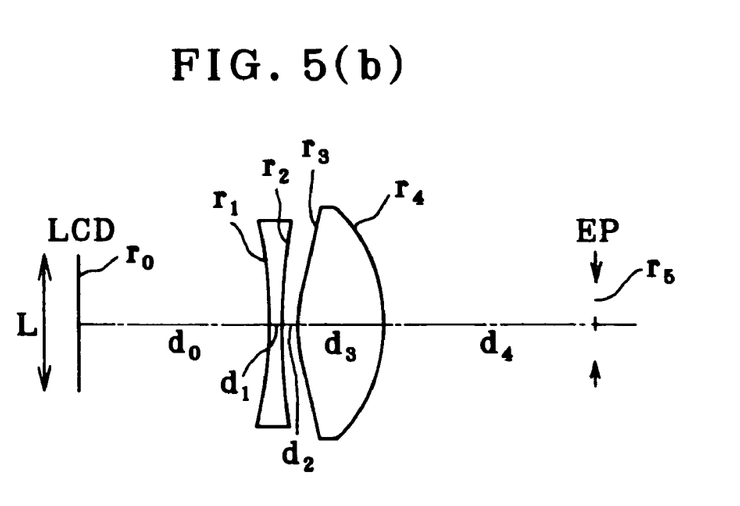
Figure 5C:
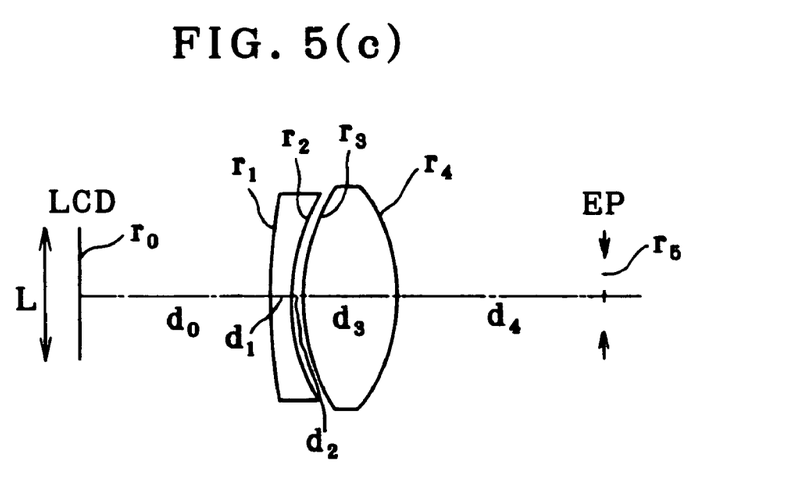

FIGS. 4(a), 4(b) and 4(c) are illustrative in section of Examples 1, 2 and 3 of the viewing optical system of the invention, including its optical axis. FIGS. 5(a), 5(b) and 5(c) are illustrative in section of Examples 4, 5 and 6 of the viewing optical system of the invention, including its optical axis. Numerical data on these examples will be given later. In each example, "LCD" is indicative of the liquid crystal display device that forms the image display device, "EP" an eye point, and "L" the diagonal length of the image display device.

EXAMPLE 1

A viewing optical system is made up of, in order from its display device side, a double-concave negative lens and a double-convex positive lens, as depicted in FIG. 4(a). The surface of the double-concave negative lens located on its object side and the surface of the double-convex positive lens located on its eye point side are each constructed of an aspheric surface. Used in this example is a transmission type liquid crystal display device wherein a light source is located behind a display screen for image displays by light transmitting through the same.

The values concerning conditions (1) to (6) and the angle of field 2ω of an observed image in the diagonal direction are set out below.

c=6.66 mm fe=20.95 mm

2ω=30.109° b/a=0.647 dp/dn=2.746 da/dn=0.533 a/c=2.153 fe/a=1.461 r5/r3=2.843

EXAMPLE 2

A viewing optical system is made up of, in order from its display device side, a double-concave negative lens and a double-convex positive lens, as depicted in FIG. 4(b). The surface of the double-concave negative lens located on its object side and the surface of the double-convex positive lens located on its eye point side are each constructed of an aspheric surface. Used in this example is a transmission type liquid crystal display device wherein a light source is located behind a display screen for image displays by light transmitting through the same.

The values concerning conditions (1) to (6) and the angle of field 2ω of an observed image in the diagonal direction are set out below.

c=6.66 mm fe=21.001 mm

2ω=30.075° b/a=0.680 dp/dn=4.088 da/dn=0.647 a/c=2.154 fe/a=1.464 r2/r3=2.926

EXAMPLE 3

A viewing optical system is made up of, in order from its display device side, a negative meniscus lens convex on its object side and a double-convex positive lens, as depicted in FIG. 4(c). The surface of the double-convex positive lens located on its object side is constructed of an aspheric surface. In this example, a reflection type liquid crystal display device is used.

The values concerning conditions (1) to (6) and the angle of field 2ω of an observed image in the diagonal direction are set out below.

c=2.88 mm fe=18.24 mm

2ω=15.051° b/a=0.654 dp/dn=6.049 da/dn=0.518 a/c=4.266 fe/a=1.485 r2/r3=0.921

EXAMPLE 4

A viewing optical system is made up of, in order from its display device side, a double-concave negative lens and a double-convex positive lens, as depicted in FIG. 5(a). The surface of the double-convex positive lens located on its eye point side is constructed of an aspheric surface. In this example, a reflection type liquid crystal display device is used.

The values concerning conditions (1) to (6) and the angle of field 2ω of an observed image in the diagonal direction are given below.

c=2.88 mm fe=18.239 mm

2ω=15.447° b/a=0.778 dp/dn=5.574 da/dn=1.424 a/c=3.789 fe/a=1.671 r2/r3=1.824

EXAMPLE 5

A viewing optical system is made up of, in order from its display device side, a double-concave negative lens and a double-convex positive lens, as depicted in FIG. 5(b). The surface of the double-convex positive lens located on its object side is constructed of an aspheric surface. Used in this example is a transmission type liquid crystal display device wherein a light source is located behind a display screen for image displays by light transmitting through the same.

The values concerning conditions (1) to (6) and the angle of field 2ω of an observed image in the diagonal direction are given below.

c=6.66 mm fe=21.205 mm

2ω=30.036° b/a=0.626 dp/dn=6.687 da/dn=1.293 a/c=2.198

$fe/a=1.449$ $r2/r3=3.340$

EXAMPLE 6

A viewing optical system is made up of, in order from its display device side, a negative meniscus lens convex toward the display device and a double-convex positive lens, as depicted in FIG. 5(c). The surface of the double-convex positive lens located on its object side is constructed of an aspheric surface. Used in this example is a transmission type liquid crystal display device wherein a light source is located behind a display screen for image displays by light transmitting through the same.

The values concerning conditions (1) to (6) and the angle of field 2ω of an observed image in the diagonal direction are given below.

c=6.66 mm fe=21.268 mm

2ω=30.021°

$b/a=0.690$ $dp/dn=4.456$ $da/dn=0.403$ $a/c=2.258$ $fe/a=1.414$ $r2/r3=1.302$

In what follows, numerical data on the respective examples will be given.
$r_1, r_2, \ldots$ : radius of curvature of each lens surface
$d_1, d_2, \ldots$ : spacing between adjacent lens surfaces
$n_{d1}, n_{d2}, \ldots$ : d-line refractive index of each lens
$V_{d1}, V_{d2}, \ldots$ : Abbe number of each lens
$r_o$: radius of curvature of the display screen of "LCD"
$r_5$: radius of curvature of the surface of "EP"
$d_4$: eye relief Length is given in mm. Here let x represent an optical axis provided that the direction of propagation of light is taken as positive, and y indicate the direction orthogonal with the optical axis. Then, aspheric surface shape is given by $$x=(y^2/r)/[1+\{1-(K+1)(y/r)^2\}^{1/2}]+A_4y^4+A_6y^6+A_8y^8$$

Here r is a paraxial radius of curvature, K is a conical coefficient, and $A_4$, $A_6$ and $A_8$ are the 4th, 6th and 8th-order aspheric coefficients, respectively.

EXAMPLE 1

| | | | |
|---|---|---|---|
| $r_0 = \infty$ (L C D) | $d_0 = 14.34$ | | |
| $r_1 = -77.680$ (Aspheric) | $d_1 = 2.17$ | $n_{d1} = 1.58423$ | $v_{d1} = 30.49$ |
| $r_2 = 69.395$ | $d_2 = 1.15$ | | |
| $r_3 = 24.413$ | $d_3 = 5.95$ | $n_{d2} = 1.52542$ | $v_{d2} = 55.78$ |
| $r_4 = -12.687$ (Aspheric) | $d_4 = 17.00$ | | |
| $r_5 = \infty$ (E P) | | | |

Aspherical Coefficients
1st Surface $K=0.000$ $A_4=-2.07664\times10^{-4}$ $A_6=-1.18835\times10^{-6}$ $A_8=-3.44641\times10^{-9}$ 4th Surface $K=0.000$ $A_4=-2.55455\times10^{-6}$ $A_6=-6.30585\times10^{-8}$ $A_8=-5.14990\times10^{-9}$

EXAMPLE 2

| | | | |
|---|---|---|---|
| $r_0 = \infty$ (L C D) | $d_0 = 14.34$ | | |
| $r_1 = -80.005$ (Aspheric) | $d_1 = 1.70$ | $n_{d1} = 1.58423$ | $v_{d1} = 30.49$ |
| $r_2 = 67.386$ | $d_2 = 1.10$ | | |
| $r_3 = 23.029$ | $d_3 = 6.95$ | $n_{d2} = 1.52542$ | $v_{d2} = 55.78$ |
| $r_4 = -12.946$ (Aspheric) | $d_4 = 17.00$ | | |
| $r_5 = \infty$ (E P) | | | |

Aspherical Coefficients
1st Surface $K=0.000$ $A_4=-1.87000\times10^{-4}$ $A_6=-9.25660\times10^{-7}$ $A_8=-5.71110\times10^{-9}$ 4th Surface $K=0.000$ $A_4=7.63990\times10{-6}$ $A_6=-1.16220\times10^{-7}$ $A_8=4.95660\times10^{-9}$

EXAMPLE 3

| | | | |
|---|---|---|---|
| $r_0 = \infty$ (L C D) | $d_0 = 12.28$ | | |
| $r_1 = 50.414$ | $d_1 = 1.06$ | $n_{d1} = 1.58423$ | $v_{d1} = 30.49$ |
| $r_2 = 9.124$ | $d_2 = 0.55$ | | |
| $r_3 = 9.908$ (Aspheric) | $d_3 = 6.42$ | $n_{d2} = 1.49236$ | $v_{d2} = 57.86$ |
| $r_4 = -9.014$ | $d_4 = 17.00$ | | |
| $r_5 = \infty$ (E P) | | | |

Aspherical Coefficients
3ed Surface $K=0.000$ $A_4=-4.23266\times10^{-4}$ $A_6=1.26605\times10^{-5}$ $A_8=-1.87739\times10^{-7}$

EXAMPLE 4

| | | | |
|---|---|---|---|
| $r_0 = \infty$ (L C D) | $d_0 = 10.91$ | | |
| $r_1 = -26.234$ | $d_1 = 1.06$ | $n_{d1} = 1.58423$ | $v_{d1} = 30.49$ |
| $r_2 = 24.828$ | $d_2 = 1.51$ | | |
| $r_3 = 13.612$ | $d_3 = 5.92$ | $n_{d2} = 1.49236$ | $v_{d2} = 57.86$ |
| $r_4 = -8.868$ (Aspheric) | $d_4 = 17.00$ | | |
| $r_5 = \infty$ (E P) | | | |

Aspherical Coefficients
4th Surface $K=0.000$ $A_4=2.46412\times10^{-4}$ $A_6=2.50349\times10^{-6}$ $A_8=1.52473\times10^{-8}$

EXAMPLE 5

| | | | |
|---|---|---|---|
| $r_0 = \infty$ (L C D) | $d_0 = 14.64$ | | |
| $r_1 = -37.022$ | $d_1 = 1.02$ | $n_{d1} = 1.58423$ | $v_{d1} = 30.49$ |
| $r_2 = 52.882$ | $d_2 = 1.32$ | | |
| $r_3 = 15.833$ (Aspheric) | $d_3 = 6.82$ | $n_{d2} = 1.52542$ | $v_{d2} = 55.78$ |
| $r_4 = -13.482$ | $d_4 = 17.00$ | | |
| $r_5 = \infty$ (E P) | | | |

Aspherical Coefficients
3ed Surface $K=0.000$ $A_4=-2.24211\times10^{-4}$ $A_6=6.92370\times10^{-7}$ $A_8=-1.96757\times10^{-9}$

EXAMPLE 6

| | | | |
|---|---|---|---|
| $r_0 = \infty$ (L C D) | $d_0 = 15.04$ | | |
| $r_1 = 68.309$ | $d_1 = 1.77$ | $n_{d1} = 1.58423$ | $v_{d1} = 30.49$ |
| $r_2 = 17.414$ | $d_2 = 0.71$ | | |
| $r_3 = 13.379$ (Aspheric) | $d_3 = 7.90$ | $n_{d2} = 1.52542$ | $v_{d2} = 55.78$ |
| $r_4 = -15.234$ | $d_4 = 17.00$ | | |
| $r_5 = \infty$ (E P) | | | |

Figure 6A:
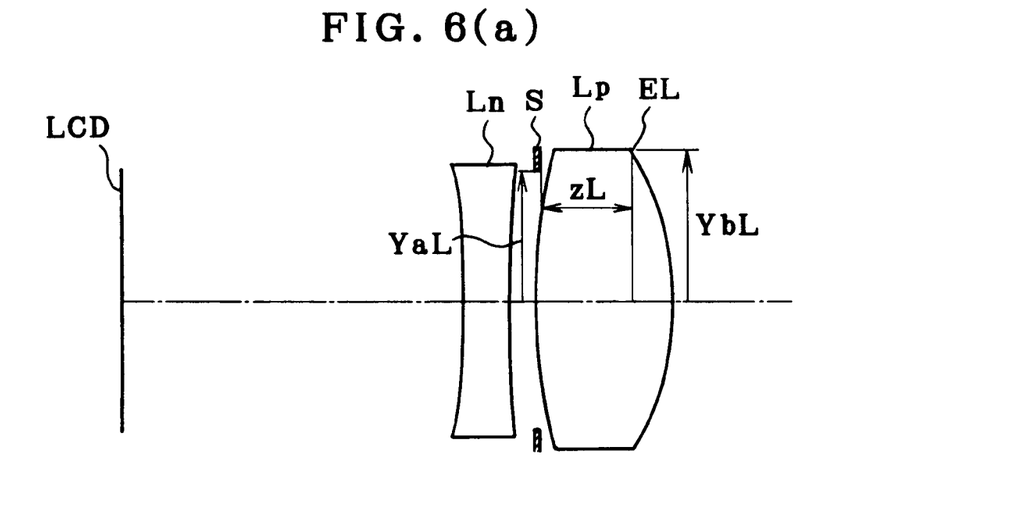
FIGS. 6(a), 6(b) and 6(c) are illustrative of how a flare-cutting stop is interposed between the negative and the positive lens in Example 1.
Figure 6B:
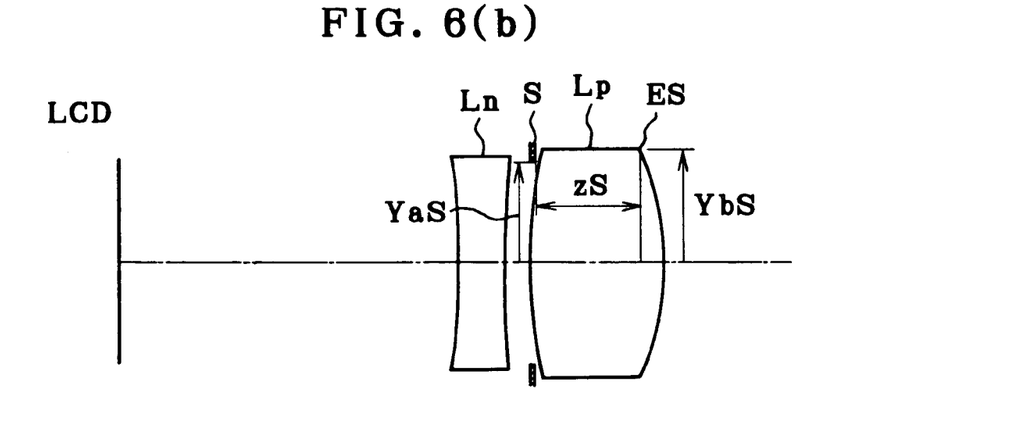
Figure 6C:
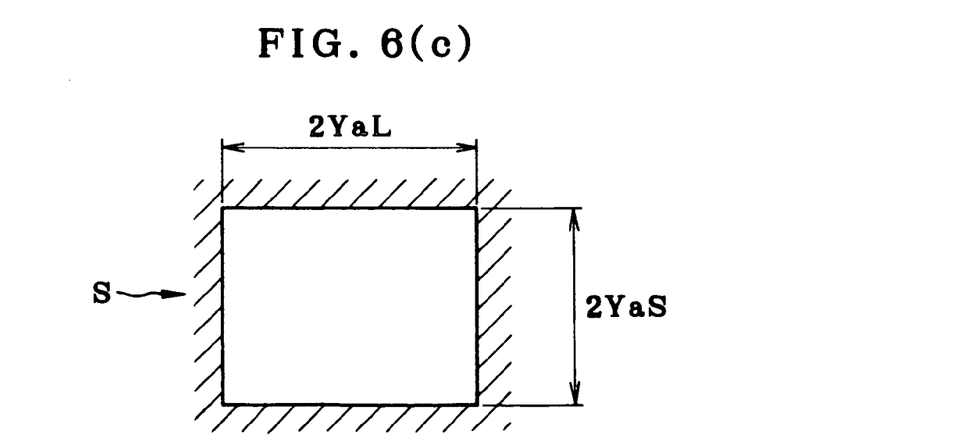
Figure 7:
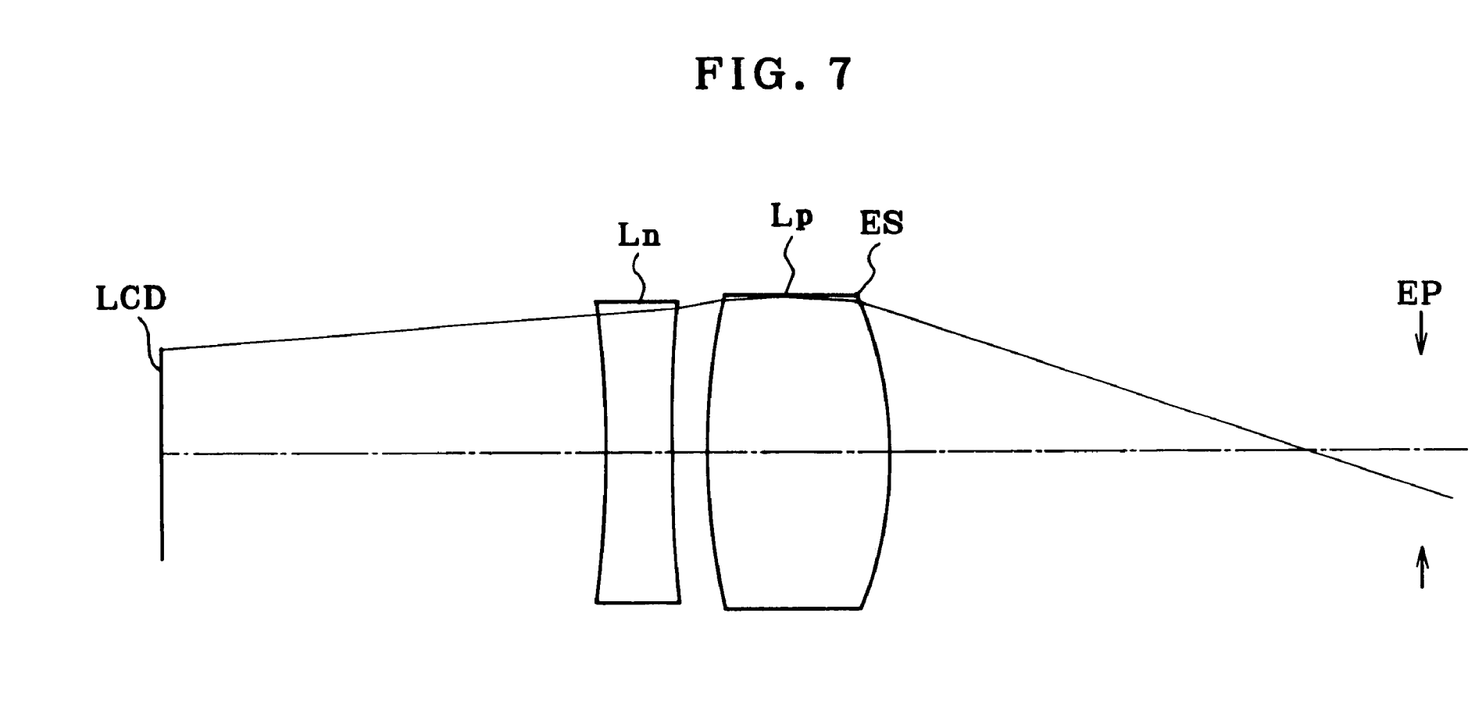
FIG. 7 is illustrative in section of how ghosts occur in the absence of a stop.

Aspherical Coefficients
3ed Surface $K=0.000$ $A_4=-1.72329\times10^{-4}$ $A_6=7.59604\times10^{-7}$ $A_8=-5.05665\times10^{-9}$ FIGS. 6(*a*), 6(*b*) and 6(*c*) are illustrative of how a ghost-cutting stop is interposed between the negative lens Ln and the positive lens Lp in Example 1. More specifically, FIG. 6(*a*) is a sectional view including the optical axis of the liquid crystal display device LCD in the long side direction, FIG. 6(*b*) is a sectional view including the optical axis of the liquid crystal display device LCD in the short side direction, and FIG. 6(*c*) is a front view of the shape of the stop S. In these figures, EL indicates the end position of the exit surface of the lens edge of the positive lens Lp in the long side direction, and ES the end position of the exit surface of the lens edge of the positive lens Lp in the short side direction. The parameters YbL, YaL, zL, YbS, YaS and zS in conditions (7) and (8) according to the invention are also given. The values of these parameters in Example 1 are enumerated just below. It is here noted that FIG. 7 is illustrative of how ghosts occur in the absence of the stop.

YbL=6.585 mm

YaL=5.5 mm zL=3.852 mm

YbS=5 mm

YaS=4.4 mm zS=4.656 mm

From these values, $(YbL-YaL)/zL=0.282$ $(YbS-YaS)/zS=0.129$

It is thus found that conditions (7) and (8) are both satisfied. As can be understood from these values, both the stop S and the positive lens Lp are of substantially rectangular shape substantially similar to that of the liquid crystal device LCD.

The stop S could be formed of a single member or as a part of a lens barrel or the like.

As can be appreciated from the foregoing, the present invention makes it possible to achieve such imaging systems as described below.

An imaging system equipped with an electronic viewfinder suitable for compactness.

An imaging system that enables a viewer to keep ready track of the imaging range.

An imaging system that can have a sufficient angle of field and satisfactory optical performance even with an image display device whose display screen has a short diagonal length.

An imaging system equipped with an electronic viewfinder well corrected for chromatic aberration of magnification.

An imaging system equipped with an electronic viewfinder wherein dust or the like clinging to a viewing optical system is less noticeable.

An imaging system equipped with an electronic viewfinder, which enables optical elements to be appropriately located even when a reflection type image display device is used as the image display device.

An imaging system that prevents harmful light such as flares and ghosts from arriving at a viewer's eye.

What we claim is:

1. An imaging system comprising an image pickup device, an image display device for displaying an image thereon, a controller for converting image information obtained from the image pickup device into signals capable of being displayed on the image display device, and a viewing optical system for guiding an image appearing on the image display device to a viewer's eye, wherein:

the viewing optical system comprises, in order from an image display device side, one negative lens element and one positive lens element, and satisfies conditions (1) and (2):

$$0.45 < b/a \tag{1}$$

$$2.3 < dp/dn < 7 \tag{2}$$

where a is a distance from a display screen of the image display device to a surface of the viewing optical system, which is located nearest to the image display device side, b is an axial length from the surface of the viewing optical system which is located nearest to the image display device side to a surface of the viewing optical system which is located nearest to a viewer side, dp is a thickness of the positive lens element, and dn is a thickness of the negative lens element.

2. An imaging system comprising an image pickup device, an image display device for displaying an image thereon, a controller for converting image information obtained from the image pickup device into signals capable of being displayed on the image display device, and a viewing optical system for guiding an image appearing on the image display device to an eye of a viewer, wherein:

the viewing optical system comprises, in order from an image display device side, one negative lens element and one positive lens element, and satisfies conditions (1) and (3):

$$0.45 < b/a \tag{1}$$

$$0.3 < da/dn < 1.7 \tag{3}$$

where a is a distance from a display screen of the image display device to a surface of the viewing optical system, which is located nearest to the image display device side, b is an axial length of the surface of the viewing optical system which is located nearest to the image display device side to the surface of the viewing optical system which is located nearest to a viewer side, da is an air separation between the negative lens element and the positive lens element, and dn is a thickness of the negative lens element.

3. The imaging system according to claim 1 or 2, which further satisfies condition (4):

$$1.0 < a/c \tag{4}$$

where a is the distance from the display screen of the image display device to the surface of the viewing optical system, which is located nearest to the image display device side, and c is a length of the viewing optical system as measured in a short side direction of the display screen.

4. The imaging system according to claim 1 or 2, which further satisfies condition (5):

$$1.3 < fe/a < 2.0 \tag{5}$$

where a is the distance from the display screen of the image display device to the surface of the viewing optical system, which is located nearest to the image display device side, and fe is a focal length of the viewing optical system.

5. The imaging system according to claim 1 or 2, which further satisfies condition (3-3):

$$0.4 < da/dn < 1.1 \tag{3-3}$$

where da is the air separation between the negative lens and the positive lens, and dn is the thickness of the negative lens.

6. The imaging system according to claim 1 or 2, which further satisfies condition (6):

$$2.0 < r2/r3 < 3.2 \tag{6}$$

where r2 is an axial radius of curvature of a surface of the negative lens that faces the viewer side, and r3 is an axial radius of curvature of a surface of the positive lens that faces the image display device side.

7. The imaging system according to claim 1 or 2, wherein the negative lens is a double-concave lens and the positive lens is a double-convex lens.

8. The imaging system according to claim 1 or 2, wherein the negative lens is a double-concave lens and the positive lens is a double-convex lens with satisfaction of condition (3-3):

$$0.4 < da/dn < 1.1 \tag{3-3}$$

where da is the air separation between the negative lens and the positive lens, and dn is the thickness of the negative lens.

9. The imaging system according to claim 1 or 2, which further comprises an image pickup optical system.

10. The imaging system according to claim 1 or 2, which further comprises a stop between the negative lens and the positive lens.

11. An imaging system comprising an image pickup device, an image display device for displaying an image thereon, a controller for converting image information obtained from the image pickup device into signals capable of being displayed on the image display device and a viewing optical system for guiding an image appearing on the image display device to a viewer's eye, wherein:

the viewing optical system comprises, in order of an image display device side, a negative lens component and a positive lens component, while a stop is located in an air space that contacts the positive lens component.

12. The imaging system according to claim 11, wherein the stop located in the air space that contacts the positive lens component is an stop interposed between the negative lens component and the positive lens component.

13. The imaging system according to claim 12, wherein a relation to the positive lens component of an effective radius of the stop interposed between the negative lens component and the positive lens component satisfies at least either one of conditions (7) and (8):

$$0.05 < (YbL-YaL)/zL < 0.4 \tag{7}$$

$$0.05 < (YbS-YaS)/zS < 0.4 \tag{8}$$

where zL is an axial distance from a stop surface to an end of an exit surface of the positive lens component as measured on a section including an optical axis in a long side direction, YaL is an effective radius of the stop as measured on the section in the long side direction, YbL is a distance from the optical axis to the end of the exit surface of the positive lens component as measured on the section in the long side direction, zS is an axial distance from the stop surface to the end of the exit surface of the positive lens component as measured on a section including the optical axis in the short side direction, YaS is an effective radius of the stop as measured on the section in the short side direction, and YbS is a distance from the optical axis to the end of the exit surface of the positive lens component as measured on the section in the short side direction.

14. The imaging system according to claim 11, wherein the negative lens component is of double-concave shape and the positive lens component is of double-convex shape.

15. The imaging system according to claim 11, wherein the stop is of substantially rectangular shape substantially similar to that of the image display device.

* * * * *